United States Patent
Isaac et al.

(10) Patent No.: US 11,072,419 B2
(45) Date of Patent: Jul. 27, 2021

(54) CONTOURING RETRACTABLE LANDING GEAR SYSTEMS

(71) Applicant: Textron Innovations Inc., Providence, RI (US)

(72) Inventors: Mark Loring Isaac, Fort Worth, TX (US); James Everett Kooiman, Fort Worth, TX (US); Charles David Hogue, N. Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 242 days.

(21) Appl. No.: 16/532,347

(22) Filed: Aug. 5, 2019

(65) Prior Publication Data

US 2021/0039774 A1  Feb. 11, 2021

(51) Int. Cl.
| | |
|---|---|
| *B64C 25/12* | (2006.01) |
| *B64C 25/34* | (2006.01) |
| *B64C 25/20* | (2006.01) |
| B64C 27/82 | (2006.01) |
| B64C 29/00 | (2006.01) |
| B64C 27/06 | (2006.01) |

(52) U.S. Cl.
CPC .............. *B64C 25/12* (2013.01); *B64C 25/20* (2013.01); *B64C 25/34* (2013.01); B64C 27/06 (2013.01); B64C 27/82 (2013.01); B64C 29/0033 (2013.01); B64C 2025/125 (2013.01)

(58) Field of Classification Search
CPC ... B64C 25/12; B64C 2025/125; B64C 25/16; B64C 25/34; B64C 2025/325
See application file for complete search history.

(56) References Cited

U.S. PATENT DOCUMENTS

| | | | | |
|---|---|---|---|---|
| 2,176,461 A | * | 10/1939 | Larsen | B64C 25/16 244/102 R |
| 2,222,975 A | * | 11/1940 | Brown | B64C 25/12 244/102 R |
| 2,332,844 A | * | 10/1943 | De Muyser | B64C 25/12 244/102 R |
| 3,533,613 A | | 10/1970 | Bendicsen | |
| 4,170,332 A | * | 10/1979 | Masclet | B64C 25/14 244/102 R |
| 4,189,117 A | * | 2/1980 | Masclet | B64C 25/10 244/102 R |
| 4,312,485 A | | 1/1982 | Masclet et al. | |

(Continued)

*Primary Examiner* — Richard R. Green
*Assistant Examiner* — William L Gmoser
(74) *Attorney, Agent, or Firm* — Lawrence Youst PLLC

(57) ABSTRACT

A retractable landing gear system configured to contour an aircraft fuselage includes a landing wheel having an axle, a wheel rotation strut assembly coupling the landing wheel to the aircraft fuselage and an actuation strut assembly configured to move the wheel rotation strut assembly between various positions including a deployed position and a stowed position. The axle of the landing wheel is pivotably coupled to a distal end of the wheel rotation strut assembly and configured to pivot relative to the wheel rotation strut assembly as the actuation strut assembly moves the wheel rotation strut assembly between the deployed and stowed positions such that the landing wheel generally contours the aircraft fuselage when the wheel rotation strut assembly is in the stowed position.

20 Claims, 9 Drawing Sheets

(56) References Cited

U.S. PATENT DOCUMENTS

| | | | |
|---|---|---|---|
| 4,422,602 A * | 12/1983 | Turiot | B64C 25/14 244/102 R |
| 5,337,976 A | 8/1994 | Derrien | |
| 9,650,128 B2 | 5/2017 | Fenny et al. | |
| 2011/0031348 A1 | 2/2011 | Thompson | |

* cited by examiner

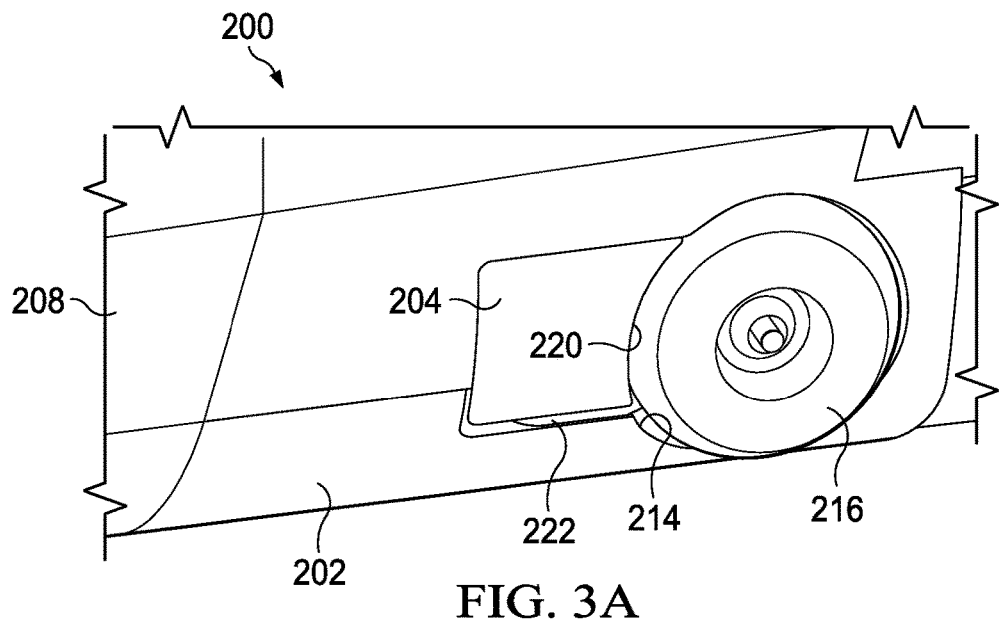
FIG. 3A
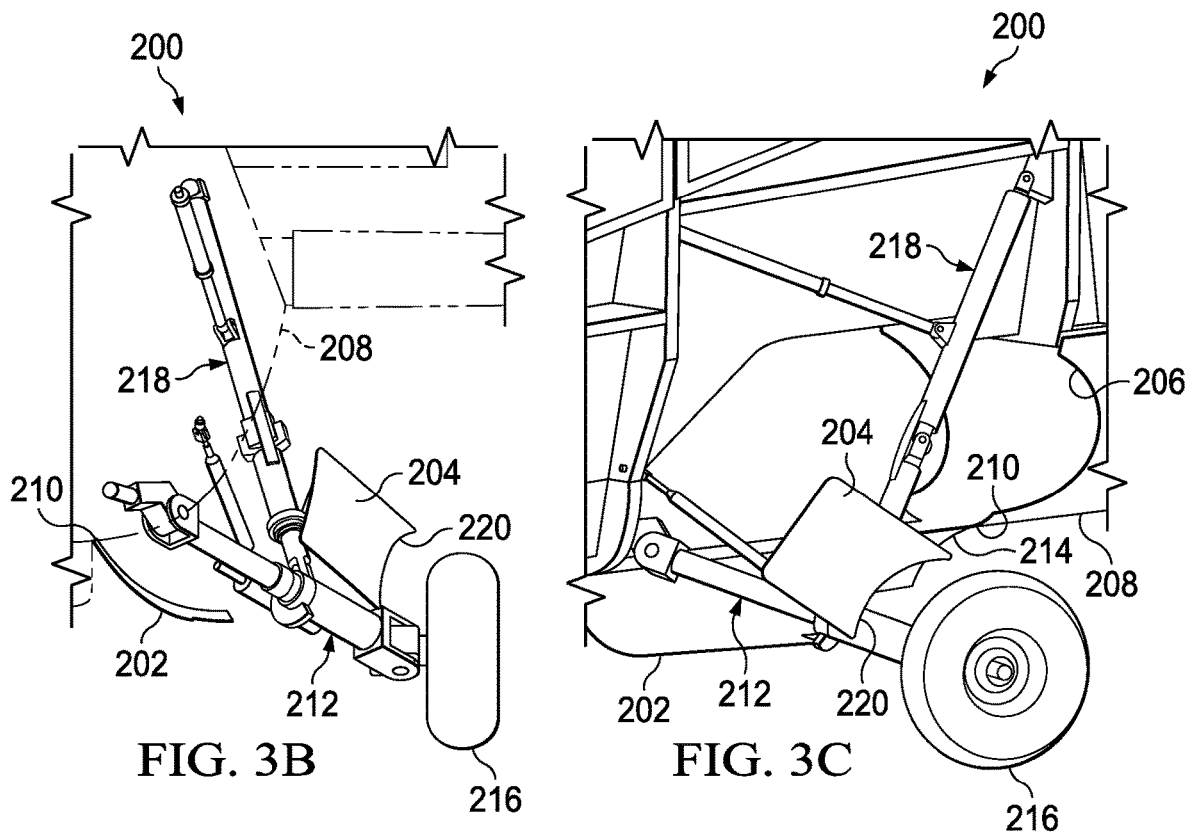
FIG. 3B
FIG. 3C

CONTOURING RETRACTABLE LANDING GEAR SYSTEMS

TECHNICAL FIELD OF THE DISCLOSURE

The present disclosure relates, in general, to landing gear systems operable for use on aircraft and, in particular, to retractable landing gear systems having landing wheels that contour the fuselage of the aircraft in the stowed position to improve aircraft aerodynamics during flight.

BACKGROUND

Aircraft employ different types of landing gear systems depending upon operational needs and other factors. One common type of landing gear system for rotorcraft is a skid landing gear system, which typically includes a pair of skids on which the rotorcraft lands. Skid landing gear systems, however, can sustain damage during run-on landings and are unable to be taxied on the ground without the aid of a helicopter dolly or ground-handling wheels. While wheel landing gear systems address both of these drawbacks of skid landing gear systems, wheel landing gear systems, as currently implemented, present other challenges. For example, fixed, non-retractable wheel landing gear systems result in a drag penalty for the aircraft during forward flight since the landing wheels are always deployed and protrude from the aerodynamic fuselage of the aircraft. Retractable wheel landing gear systems may also result in a drag penalty if the landing wheels non-aerodynamically protrude from the aircraft fuselage while retracted during flight. Other retractable wheel landing gear systems have landing wheels that are stowable into a landing gear bay that is fully enclosed by a bay door when the landing wheels are retracted into the bay. The bay door, however, adds to the overall weight of the landing gear and results in a weight penalty for the aircraft. Yet other wheel landing gear systems require complex, and often heavy, mechanisms that can negatively impact the cost, weight and maintenance requirements of the aircraft. Accordingly, a need has arisen for a retractable wheel landing gear system that reduces drag, conserves weight, reduces complexity and addresses other drawbacks of current landing gear systems.

SUMMARY

In a first aspect, the present disclosure is directed to a retractable landing gear system configured to contour an aircraft fuselage including a landing wheel having an axle, a wheel rotation strut assembly coupling the landing wheel to the aircraft fuselage and an actuation strut assembly configured to move the wheel rotation strut assembly between various positions including a deployed position and a stowed position. The axle of the landing wheel is pivotably coupled to a distal end of the wheel rotation strut assembly and configured to pivot relative to the wheel rotation strut assembly as the actuation strut assembly moves the wheel rotation strut assembly between the deployed and stowed positions such that the landing wheel generally contours the aircraft fuselage when the wheel rotation strut assembly is in the stowed position.

In some embodiments, the landing wheel may be exposed when the wheel rotation strut assembly is in the stowed position. In certain embodiments, the landing wheel may be generally flush with the aircraft fuselage when the wheel rotation strut assembly is in the stowed position. In some embodiments, the wheel rotation strut assembly may include upper and lower rotator struts having a common axis of rotation, the lower rotator strut rotating relative to the upper rotator strut as the actuation strut assembly moves the wheel rotation strut assembly between the deployed and stowed positions to pivot the axle of the landing wheel relative to the lower rotator strut. In certain embodiments, the axle of the landing wheel may pivot about a landing wheel alignment axis perpendicular to the common axis of rotation of the upper and lower rotator struts. In some embodiments, the actuation strut assembly may be coupled to the lower rotator strut. In certain embodiments, the upper rotator strut may have a larger angle of rotation about the common axis than the lower rotator strut as the wheel rotation strut assembly moves between the deployed and stowed positions. In some embodiments, the wheel rotation strut assembly may include a wheel axle pivot subassembly activated by the relative rotation between the upper and lower rotator struts to pivot the axle of the landing wheel relative to the lower rotator strut.

In some embodiments, the wheel axle pivot subassembly may include a gear coupled to the upper rotator strut, a linear gearbox engaged with the gear and coupled to the lower rotator strut and an axle positioning rod engaged with the linear gearbox and having an end coupled to the axle of the landing wheel. In certain embodiments, the relative rotation between the upper and lower rotator struts may cause the gear to drive the linear gearbox to move the axle positioning rod, thereby pivoting the axle of the landing wheel relative to the lower rotator strut. In certain embodiments, the gear may be a sector gear. In some embodiments, the actuation strut assembly may include a shock absorber. In certain embodiments, the actuation strut assembly may include a gear retraction actuator configured to move the wheel rotation strut assembly between the deployed and stowed positions, the gear retraction actuator having an end coupled to the aircraft fuselage. In some embodiments, the actuation strut assembly may include an upper swinging arm having an end hingably coupled to the aircraft fuselage. In certain embodiments, an end of the gear retraction actuator may be coupled to the upper swinging arm.

In some embodiments, the retractable landing gear system may include a cardan pin having proximal and distal ends, the proximal end of the cardan pin hingably coupled to the aircraft fuselage, the distal end of the cardan pin hingably coupled to the wheel rotation strut assembly. In such embodiments, the cardan pin may form an angled body. In certain embodiments, the retractable landing gear system may include a pivoting axle mount having a distal end coupled to the axle of the landing wheel and a proximal end hingably coupled to the distal end of the wheel rotation strut assembly. The pivoting axle mount may pivot relative to the wheel rotation strut assembly as the actuation strut assembly moves the wheel rotation strut assembly between the deployed and stowed positions. In certain embodiments, the retractable landing gear system may include an upper shield coupled to the actuation strut assembly. The upper shield may be substantially flush with the aircraft fuselage when the wheel rotation strut assembly is in the stowed position. In some embodiments, one or more sides of the upper shield may contour a circumference of the landing wheel.

In a second aspect, the present disclosure is directed to an aircraft including a fuselage and a retractable landing gear system configured to contour the fuselage. The retractable landing gear system includes a landing wheel having an axle, a wheel rotation strut assembly coupling the landing wheel to the fuselage and an actuation strut assembly configured to move the wheel rotation strut assembly between various positions including a deployed position and a stowed position. The axle of the landing wheel is pivotably coupled to a distal end of the wheel rotation strut assembly and configured to pivot relative to the wheel rotation strut assembly as the actuation strut assembly moves the wheel rotation strut assembly between the deployed and stowed positions such that the landing wheel generally contours the fuselage when the wheel rotation strut assembly is in the stowed position.

In some embodiments, the fuselage may form a compartment to receive the wheel rotation strut assembly and the landing wheel in the stowed position. In certain embodiments, the actuation strut assembly may include segments foldable into the fuselage compartment when the wheel rotation strut assembly is in the stowed position. In such embodiments, the actuation strut assembly may include a locking device between the segments to lock the segments into an extended position when the wheel rotation strut assembly is in the deployed position. In some embodiments, the fuselage compartment may be shaped to contour a circumference of the landing wheel. In certain embodiments, the retractable landing gear system may include a lower shield hingably coupled to the fuselage and configured to open as the wheel rotation strut assembly moves into the deployed position and close as the wheel rotation strut assembly moves into the stowed position. In some embodiments, the lower shield may be substantially flush with the fuselage in the closed position.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are various views of a retractable landing gear system in stowed and deployed positions in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
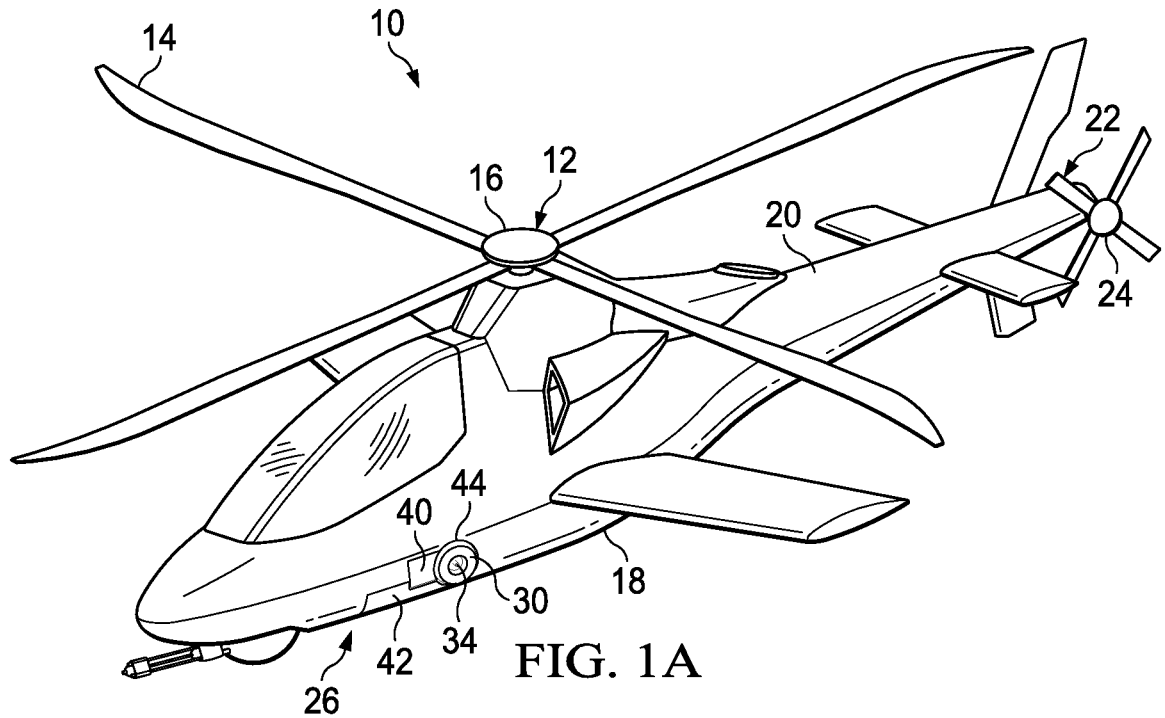
FIGS. 1A-1B are schematic illustrations of a helicopter having a retractable landing gear system in accordance with embodiments of the present disclosure.
Figure 1B:
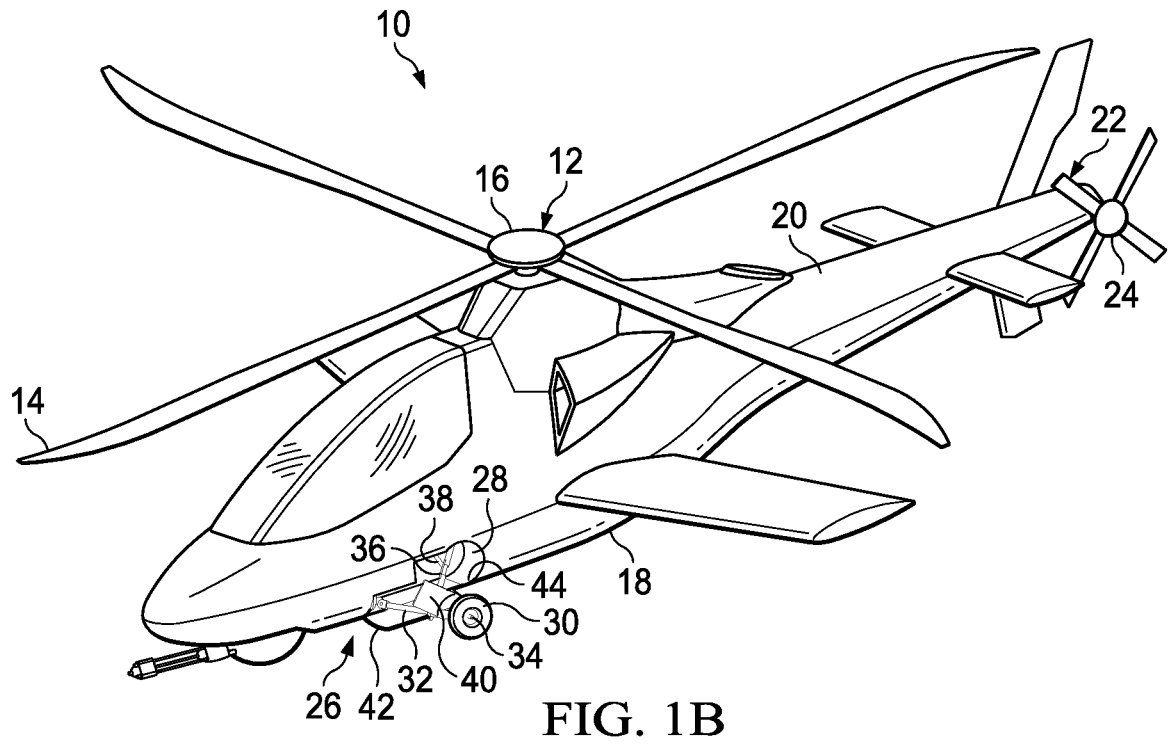

Referring to FIGS. 1A-1B in the drawings, a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor hub 16 is rotatable relative to fuselage 18. The pitch of rotor blades 14 can be collectively and/or cyclically manipulated to selectively control direction, thrust and lift of helicopter 10. A tailboom 20 extends from fuselage 18 in the aft direction. An anti-torque system 22 includes a tail rotor 24 that is rotatably coupled to the aft portion of tailboom 20. Anti-torque system 22 manages the yaw of helicopter 10.

Helicopter 10 includes a retractable landing gear system 26 that is stowable into a compartment, or bay, 28 to contour fuselage 18 during flight as shown in FIG. 1A. Retractable landing gear system 26 may also be extended or deployed for landing operations as shown in FIG. 1B. Retractable landing gear system 26 includes a landing wheel 30 coupled to fuselage 18 by a wheel rotation strut assembly 32. Axle 34 of landing wheel 30 is pivotably coupled to the distal end of wheel rotation strut assembly 32. The proximal end of wheel rotation strut assembly 32 is hingably coupled to fuselage 18. Wheel rotation strut assembly 32 swings between the stowed position shown in FIG. 1A and the deployed position shown in FIG. 1B by an actuation strut assembly 36. Actuation strut assembly 36 includes two or more segments, one of which may be a shock absorber, which are folded into compartment 28 when retractable landing gear system 26 is in the stowed position. Actuation strut assembly 36 also includes a gear retraction actuator 38, one end of which is coupled to fuselage 18, which provides a motive force for moving retractable landing gear system 26 between the stowed and deployed positions.

Retractable landing gear system 26 includes two shields, or doors, 40, 42 that are substantially flush with fuselage 18 when retractable landing gear system 26 is in the stowed position. Shields 40, 42 are shaped to partially enclose compartment 28 and minimize gaps therebetween by contouring one another to enhance the aerodynamics and reduce the drag penalty of helicopter 10. The aft side of upper shield 40 contours the circumference of landing wheel 30 and may be coupled to either wheel rotation strut assembly 32 or actuation strut assembly 36. Lower shield 42 is hingably coupled to fuselage 18 and configured to close when retractable landing gear system 26 is in the stowed position as shown in FIG. 1A and open as retractable landing gear system 26 is deployed as shown in FIG. 1B. Lower shield 42 is substantially flush with fuselage 18 when closed. The aft side of lower shield 42 contours the circumference of landing wheel 30, as does edge 44 of compartment 28.

Landing wheel axle 34 pivots, or swings, relative to wheel rotation strut assembly 32 as actuation strut assembly 36 moves retractable landing gear system 26 between the deployed and stowed positions such that landing wheel 30 generally contours fuselage 18 when retractable landing gear system 26 is in the stowed position. Retractable landing gear system 26 allows for a passive rotation of landing wheel axle 34 to align landing wheel 30 to the contour of fuselage 18 in the stowed position. Landing wheel 30 is exposed to the outside of helicopter 10 and is generally flush with fuselage 18 when retractable landing gear system 26 is in the stowed position as shown in FIG. 1A. Because landing wheel 30 contours fuselage 18, a door is not required to cover landing wheel 30, thereby reducing the complexity and weight of retractable landing gear system 26. Shields 40, 42 may also be smaller since they need not cover landing wheel 30, further reducing the weight of helicopter 10. Smaller shields also reduce the amount of drag or buffeting experienced by helicopter 10 when retractable landing gear system 26 is deployed.

It should be appreciated that helicopter 10 is merely illustrative of a variety of aircraft that can implement the embodiments disclosed herein. Indeed, retractable landing gear system 26 may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that retractable landing gear system 26 can be integrated into a variety of aircraft configurations. It should be appreciated that even though aircraft are particularly well-suited to implement the embodiments of the present disclosure, non-aircraft vehicles and devices can also implement the embodiments. Although the left side of retractable landing gear system 26 was described in FIGS. 1A-1B, one of ordinary skill in the art will appreciate that a similar retractable landing wheel may be implemented on the right side of helicopter 10.

Figure 2A:
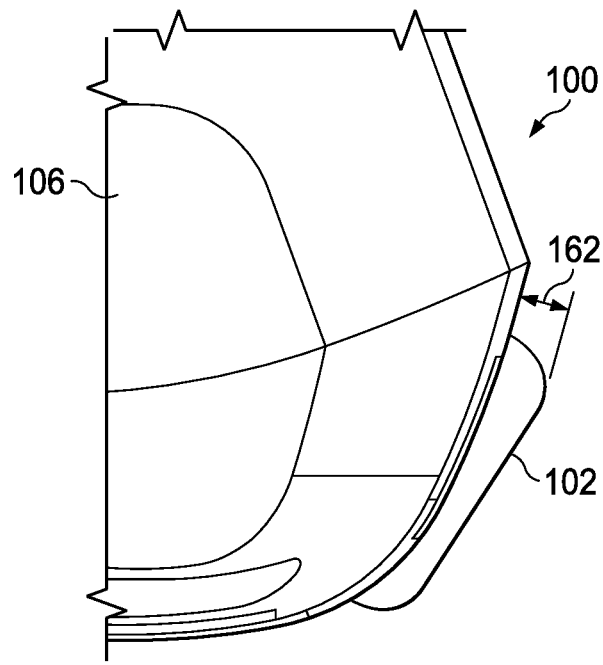
FIGS. 2A-2L are various views of a retractable landing gear system moving between a stowed position and a deployed position in accordance with embodiments of the present disclosure.
Figure 2B:
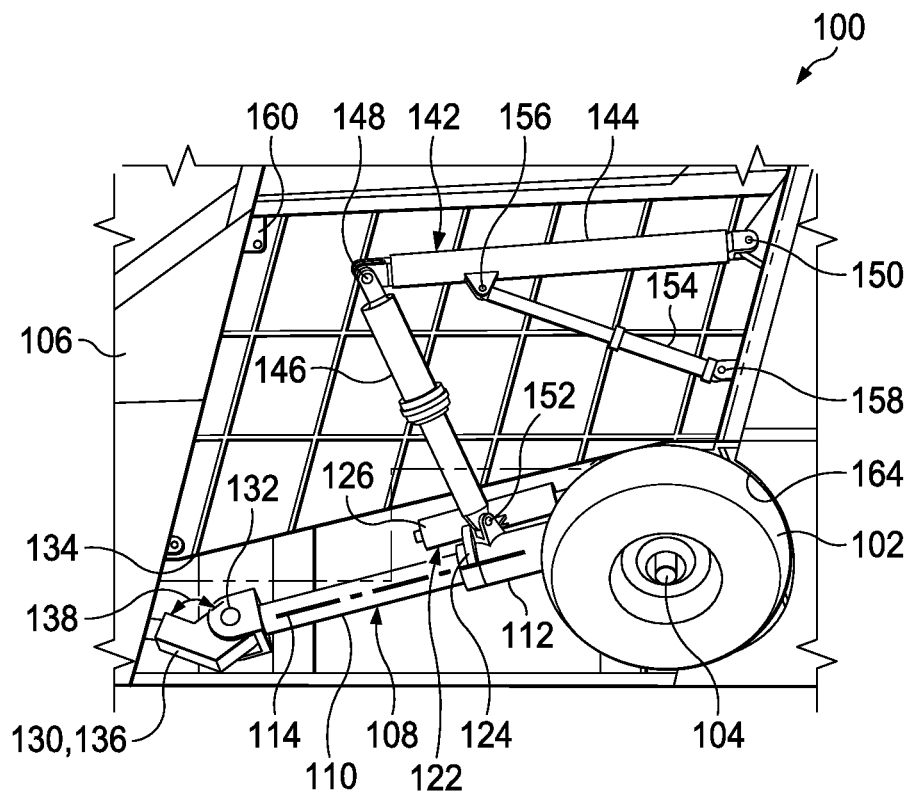
Figure 2C:
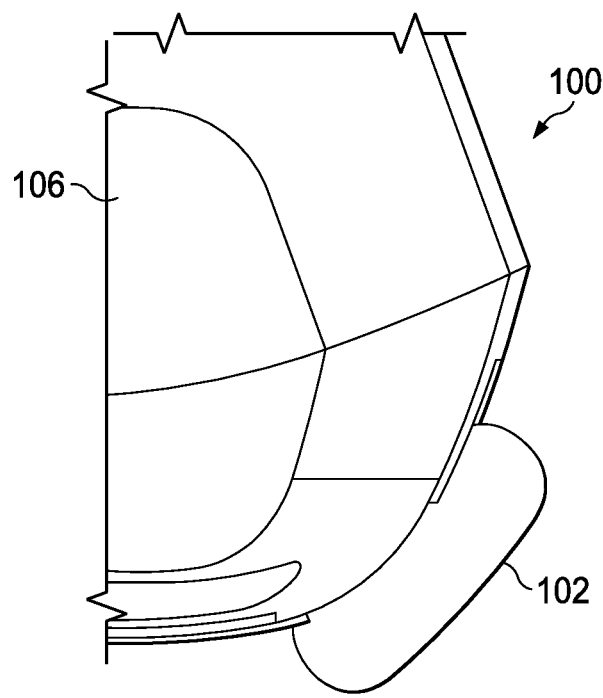
Figure 2D:
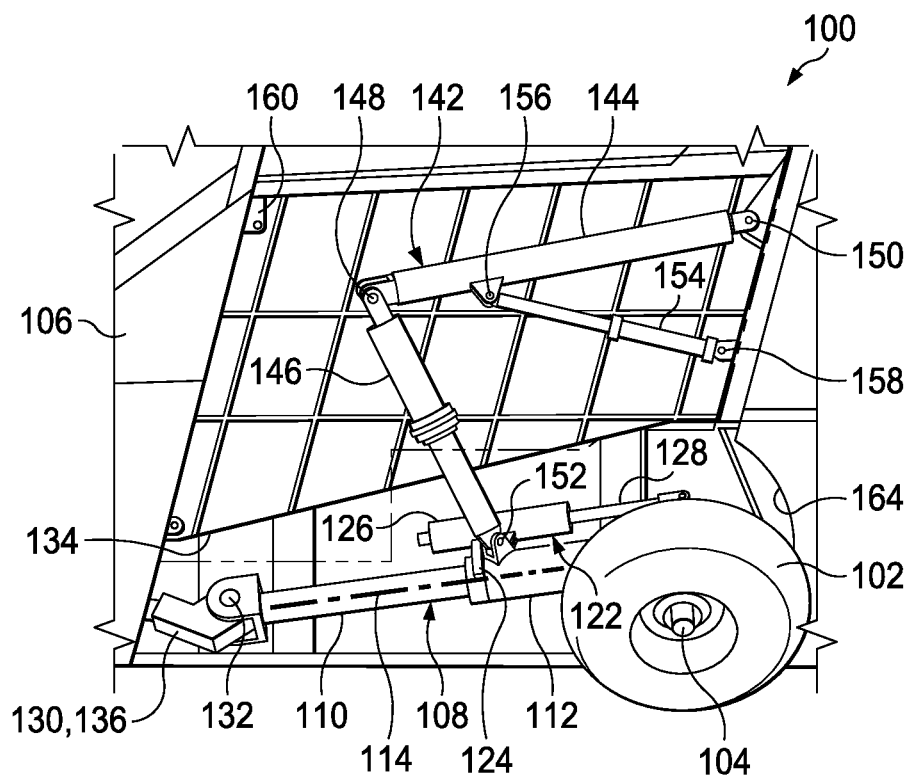
Figure 2E:
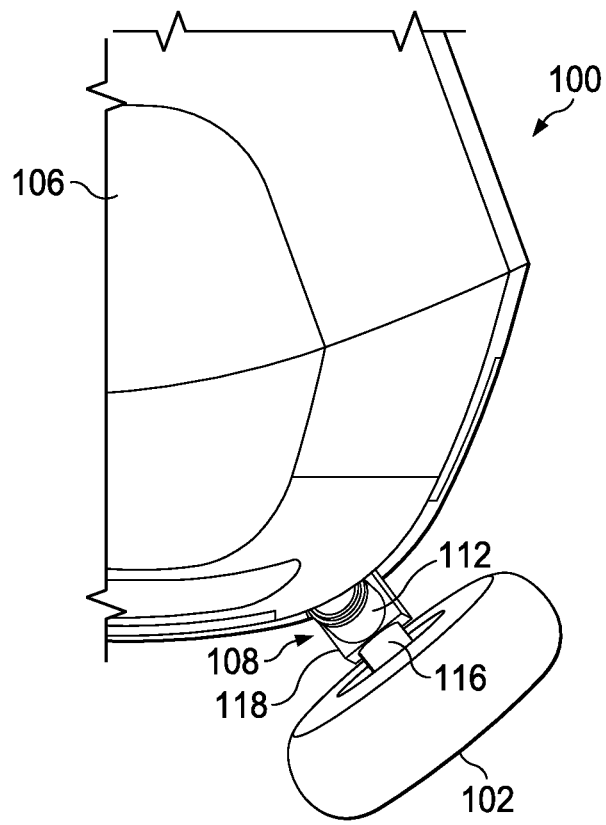
Figure 2F:
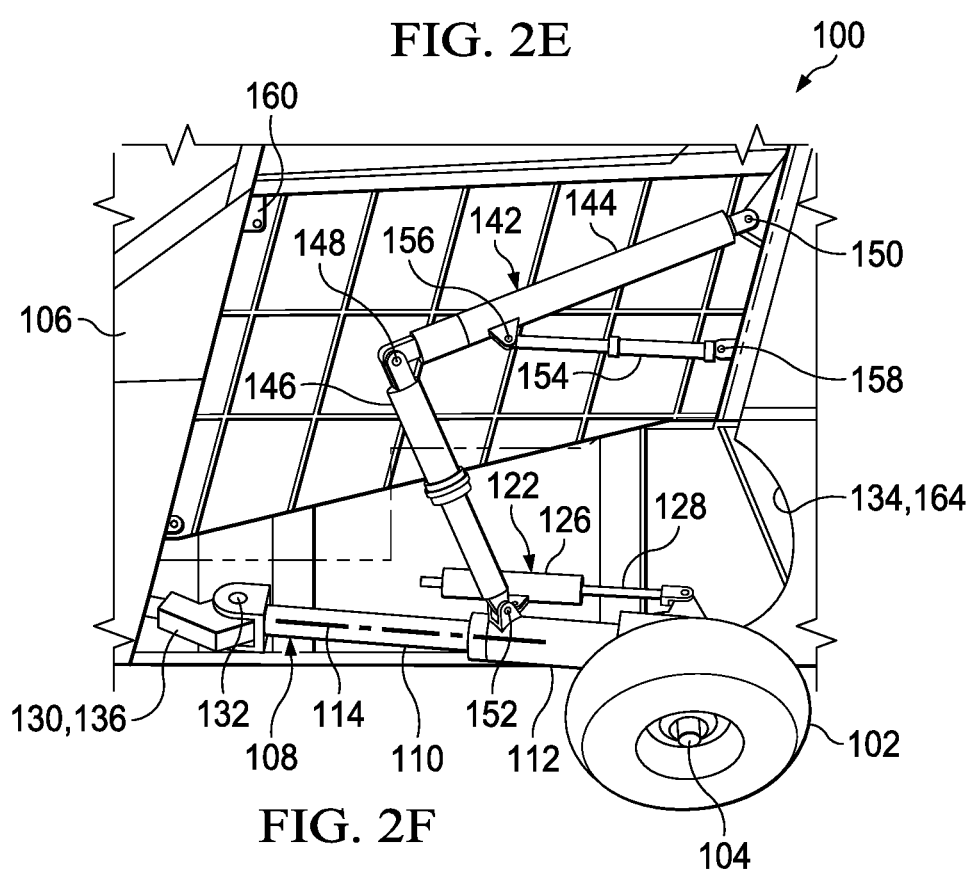
Figure 2G:
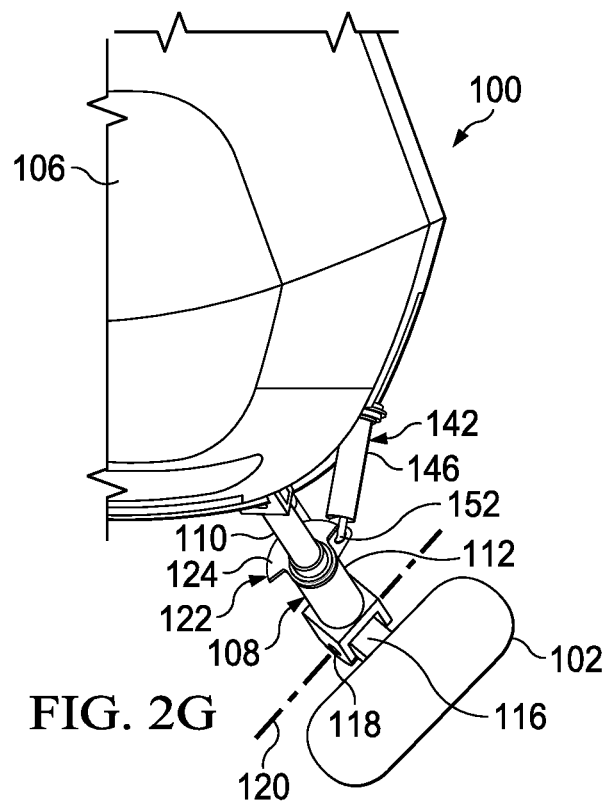
Figure 2H:
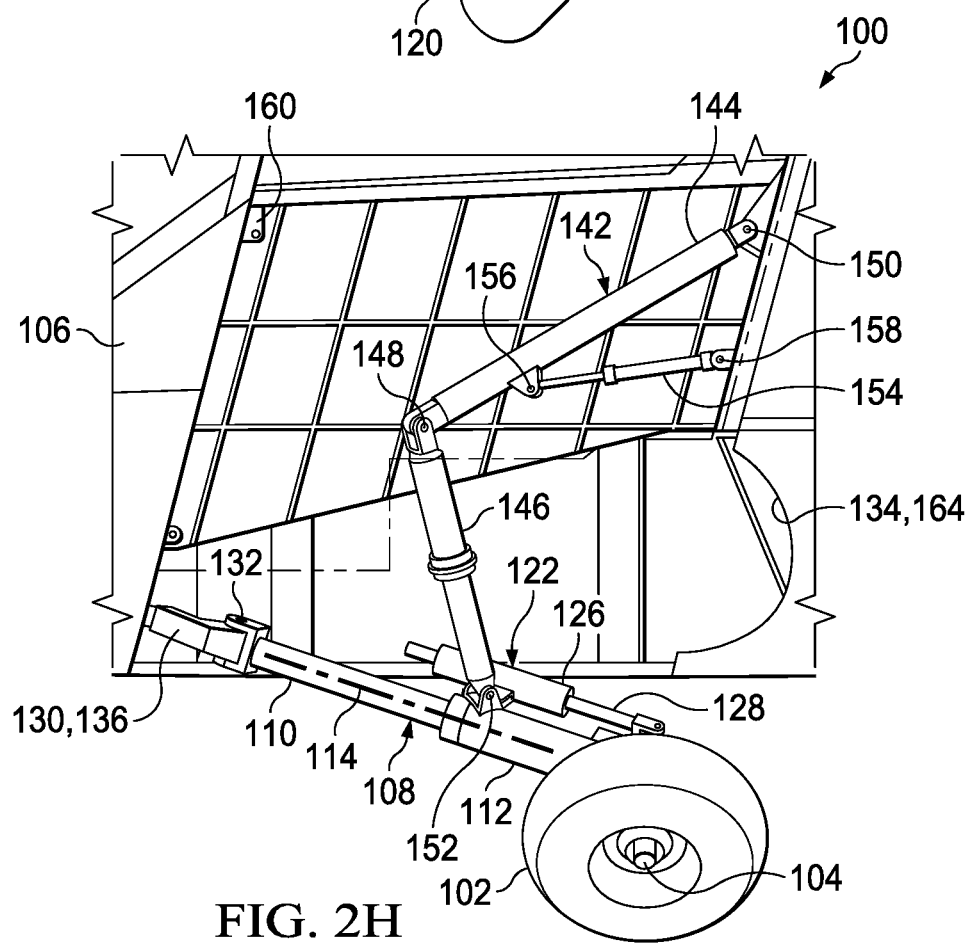
Figure 2I:
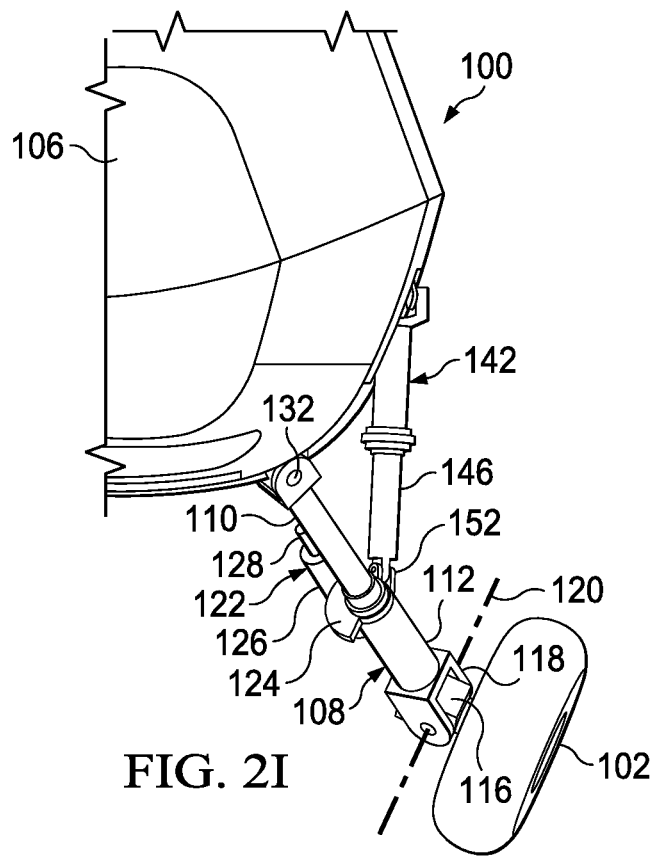
Figure 2J:
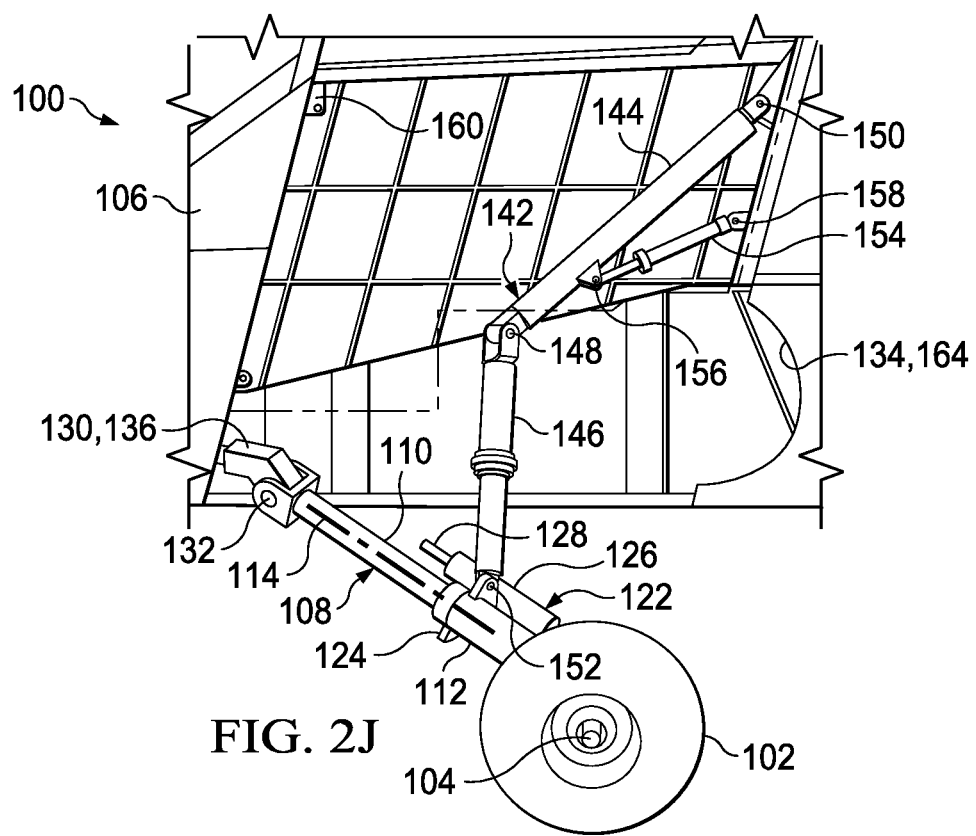
Figure 2K:
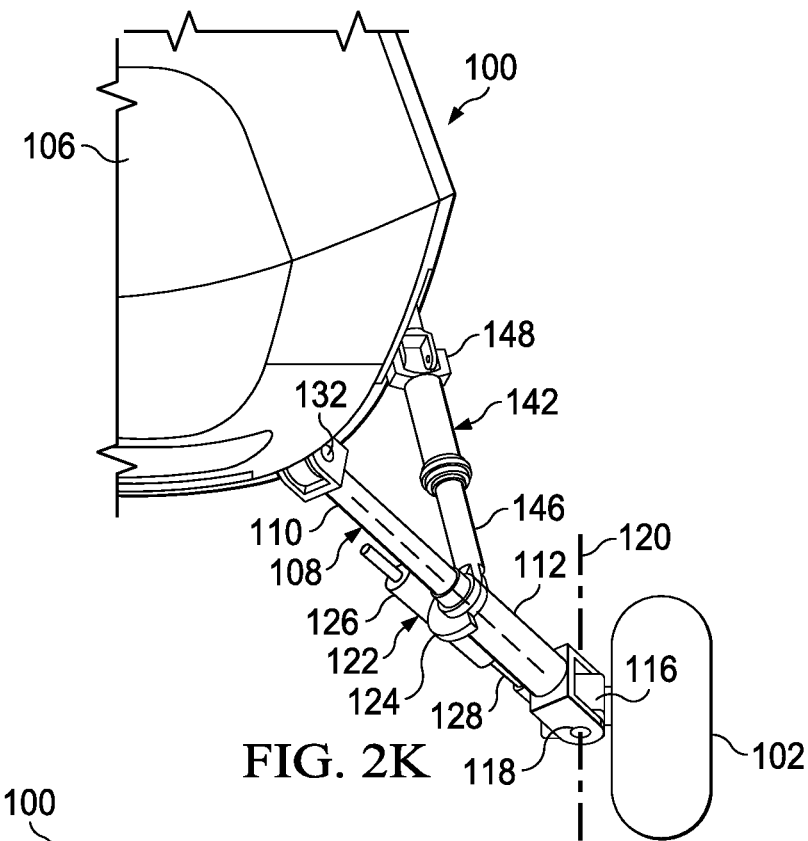
Figure 2L:
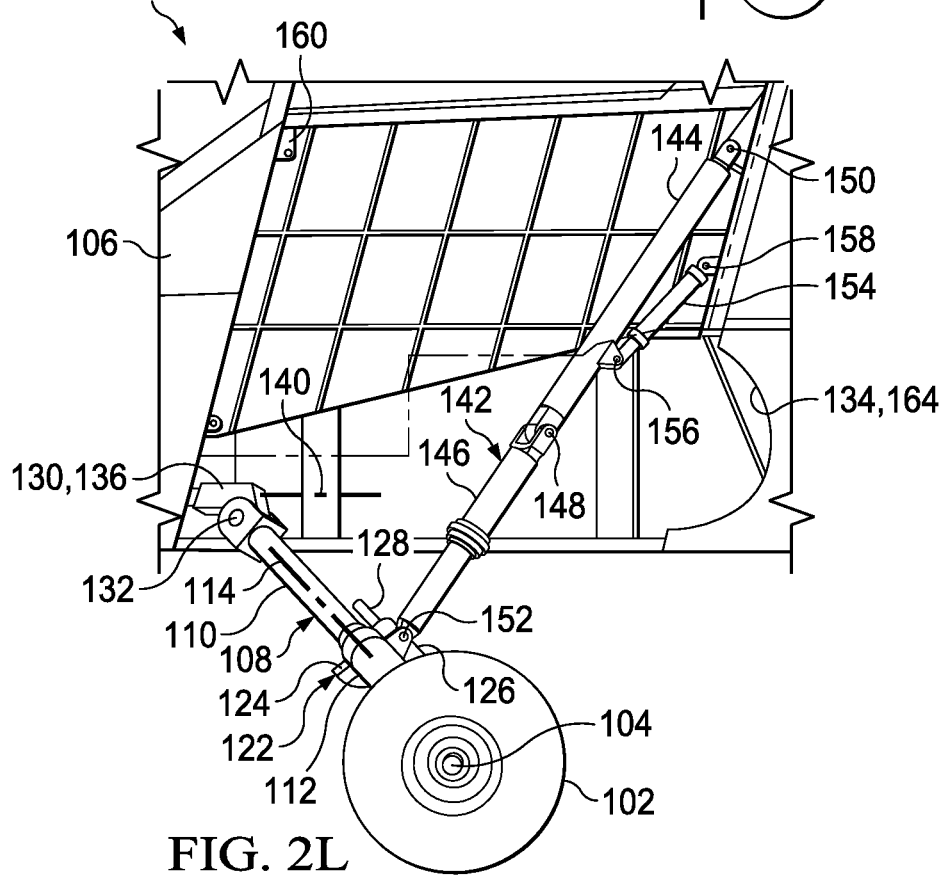

Referring to FIGS. 2A-2L in the drawings, retractable landing gear system 100 is shown in a sequence of positions from a stowed position in FIGS. 2A-2B to a deployed position in FIGS. 2K-2L. FIGS. 2C-2J show a sequence of intermediate positions between the stowed and deployed positions. Shields and doors have been hidden from view in FIGS. 2A-2L to better illustrate the underlying components and operation of retractable landing gear system 100. Landing wheel 102 is freely rotatable about axle 104, which is coupled to aircraft fuselage 106 by wheel rotation strut assembly 108. Wheel rotation strut assembly 108 includes an upper rotator strut 110 and a lower rotator strut 112 that are rotatable relative to one another about a common axis of rotation 114. Landing wheel axle 104 is pivotably coupled to the distal end of lower rotator strut 112 by a pivoting axle mount 116. In particular, the distal end of pivoting axle mount 116 is coupled to landing wheel axle 104 and the proximal end of pivoting axle mount 116 is hingably coupled to a bifurcated distal end of lower rotator strut 112 to form hinge joint 118. Landing wheel axle 104 pivots about a landing wheel alignment axis 120 at hinge joint 118. Landing wheel alignment axis 120 is generally perpendicular to common axis of rotation 114 of upper and lower rotator struts 110, 112.

A wheel axle pivot subassembly 122 turns pivoting axle mount 116 about landing wheel alignment axis 120. Wheel axle pivot subassembly 122 includes a sector gear 124 coupled to upper rotator strut 110. In other embodiments, sector gear 124 may be a full, 360-degree gear. Sector gear 124 may be integral with and/or machined into upper rotator strut 110. In other embodiments, sector gear 124 may be a separate component fixedly coupled to upper rotator strut 110. Wheel axle pivot subassembly 122 also includes a linear gearbox 126 engaged with sector gear 124 and coupled to lower rotator strut 112. Wheel axle pivot subassembly 122 also includes an axle positioning rod 128 engaged with linear gearbox 126 and having a distal end coupled to pivoting axle mount 116. In some embodiments, the distal end of axle positioning rod 128 may be hingably coupled to pivoting axle mount 116. Pivoting axle mount 116 is driven by axle positioning rod 128, which is driven by linear gearbox 126, which is driven by sector gear 124. Relative rotation between upper and lower rotator struts 110, 112 causes sector gear 124 to drive linear gearbox 126 to move axle positioning rod 128, which turns pivoting axle mount 116 relative to lower rotator strut 112 about landing wheel alignment axis 120.

Wheel rotation strut assembly 108 is coupled to aircraft fuselage 106 by a rotating cardan pin 130, which accommodates controlled rotation of wheel rotation strut assembly 108 in its various positions. The distal end of cardan pin 130 is hingably coupled to the bifurcated proximal end of upper rotator strut 110 to form hinge joint 132. The proximal end of cardan pin 130 is hingably coupled to aircraft fuselage 106 inside compartment 134. In other embodiments, the proximal end of cardan pin 130 may be rotatably coupled to a portion of aircraft fuselage 106 that is not within compartment 134. Cardan pin 130 forms an angled body, or key, 136 that may form any shape or angle. In the illustrated embodiment, angled body 136 forms an obtuse angle 138 best seen in FIG. 2B, although in other embodiments angled body 136 may form an acute or right angle. Cardan pin 130 revolves about cardan pin axis 140 shown in FIG. 2L.

Retractable landing gear system 100 includes actuation strut assembly 142, which moves wheel rotation strut assembly 108 between the stowed and deployed positions. Actuation strut assembly 142 includes an upper swinging arm 144 and a shock absorber 146 hingably connected to one another at hinge joint 148. The proximate end of upper swinging arm 144 is hingably coupled to aircraft fuselage 106 at hinge joint 150. The distal end of shock absorber 146 is hingably coupled to lower rotator shaft 112 at hinge joint 152. In some embodiments, shock absorber 146 may be a pneumatic air-oil hydraulic shock absorber or oleo strut. Actuation strut assembly 142 also includes a gear retraction actuator 154, one end of which is hingably coupled to upper swinging arm 144 at hinge joint 156 and the other end of which is hingably coupled to aircraft fuselage 106 at hinge joint 158. In other embodiments, gear retraction actuator 154 may instead be located on the forward side of upper swinging arm 144 and couple upper swinging arm 144 to, for example, hinge 160. In yet other embodiments, gear retraction actuator 154 may be coupled to shock absorber 146 instead of upper swinging arm 144. Either or both ends of gear retraction actuator 154 may alternatively be fixedly coupled to upper swinging arm 144 or aircraft fuselage 106. Actuation strut assembly 142 may also include two or more gear retraction actuators in some embodiments. A locking device (not shown) at hinge joint 148 between upper swinging arm 144 and shock absorber 146 may be utilized to lock upper swinging arm 144 and shock absorber 146 into an extended position when deployed as shown in FIGS. 2K-2L. The locking device may lock by moving slightly past an alignment threshold so that upper swinging arm 144 and shock absorber 146 act as a single strut during landing.

As seen in FIGS. 2A-2B, compartment 134 receives wheel rotation strut assembly 108, landing wheel 102 and actuation strut assembly 142 in the stowed position. Upper swinging arm 144 and shock absorber 146 fold into compartment 134 when wheel rotation strut assembly 108 is in the stowed position. In the stowed position, landing wheel 102 generally contours and is generally flush with aircraft fuselage 106 as shown in FIG. 2A. Depending on the embodiment, distance 162 at which landing wheel 102 protrudes from aircraft fuselage 106 may vary to provide desired aerodynamic characteristics for the aircraft. For example, distance 162 may be zero or a non-zero amount in the stowed position. Landing wheel 102 is exposed to the outside of the aircraft when wheel rotation strut assembly 108 is in the stowed position, thereby reducing the overall weight of the aircraft by eliminating the need for a door to cover landing wheel 102. Aft edge 164 of compartment 134 contours the circumference of landing wheel 102 to prevent airflow into and out of compartment 134 during flight.

Gear retraction actuator 154 may receive a signal or other input to initiate movement of wheel rotation strut assembly 108 from the stowed position in FIGS. 2A-2B to the deployed position in FIGS. 2K-2L. Gear retraction actuator 154 unfolds upper swinging arm 144 and shock absorber 146 out of compartment 134 so that they are colinear and lock into place using the locking device. In some embodiments, upper swinging arm 144 may have a range of motion between the stowed and deployed positions of between 20 and 65 degrees such as 45 degrees. In folding or unfolding between the stowed and deployed positions, shock absorber 146 may have a range of motion of between 60 and 180 degrees such as 135 degrees relative to upper swinging arm 144. As actuation strut assembly 142 unfolds, actuation strut assembly 142 rotates and swings lower rotator strut 112 as wheel rotation strut assembly 108 is swung out of compartment 134 about cardan pin axis 140. As seen in the sequence of positions in FIGS. 2A-2L, both upper and lower rotator struts 110, 112 rotate as they swing outward, although each has a different angle of rotation such that upper and lower rotator struts 110, 112 rotate relative to one another. Thus, each rotator strut 110, 112 has a different rate of rotation about common axis of rotation 114 as wheel rotation strut assembly 108 is deployed. In some embodiments, upper rotator strut 110 may have a larger angle of rotation about common axis of rotation 114 than lower rotator strut 112, although in other embodiments lower rotator strut 112 may have the larger angle of rotation as wheel rotation strut assembly 108 deploys. Wheel axle pivot subassembly 122 is activated by the relative rotation between upper and lower rotator struts 110, 112 to pivot landing wheel axle 104 relative to lower rotator strut 112. In particular, as lower rotator strut 112 rotates relative to upper rotator strut 110, sector gear 124 drives linear gearbox 126, which drives axle positioning rod 128 to pivot pivoting axle mount 116 and landing wheel axle 104 about landing wheel alignment axis 120 so that landing wheel 102 is vertically oriented for landing in the deployed position as shown in FIGS. 2K-2L and contours aircraft fuselage 106 in the stowed position as shown in FIGS. 2A-2B. Landing wheel axle 104 may have a range of motion in a range between 20 and 90 degrees such as 45 degrees depending on the embodiment. The relative rotation between upper and lower rotator struts 110, 112 may also vary widely depending on the embodiment including a differential rotation of between 20 and 360 degrees such as 90 degrees.

Wheel rotation strut assembly 108 experiences or facilitates simultaneous rotation about three independent axes of rotation to provide proper alignment of landing wheel 102 in both the stowed and deployed positions including swinging about cardan pin axis 140, relative rotation between upper and lower rotator struts 110, 112 about common axis of rotation 114 and pivoting of landing wheel axle 104 relative to lower rotator strut 112 about landing wheel alignment axis 120. Rotations about these axes 114, 120, 140 may also be scheduled during the range of motion between the deployed and stowed positions to minimize interference with aircraft fuselage 106 and any landing gear doors or shields. When gear retraction actuator 154 receives a signal or other input to move into the stowed position, retractable landing gear system 100 moves in the opposite sequence of motions shown in FIG. 2A through FIG. 2L so that landing wheel 102 is stowed into compartment 134 and provides the aforementioned aerodynamic, weight and other benefits of retractable landing gear system 100.

Referring to FIGS. 3A-3C in the drawings, a retractable landing gear system is schematically illustrated and generally designated 200. In particular, FIG. 3A illustrates retractable landing gear system 200 in the stowed position and FIGS. 3B-3C illustrate retractable landing gear system 200 in the deployed position. Retractable landing gear system 200 includes lower shield 202 and upper shield 204, which partially enclose compartment 206 and provide an aerodynamic exterior for the aircraft during flight. Lower shield 202 is hingably coupled to fuselage 208 at hinge joint 210 and is configured to open as wheel rotation strut assembly 212 moves into the deployed position shown in FIGS. 3B-3C and close as wheel rotation strut assembly 212 moves into the stowed position shown in FIG. 3A. Lower shield 202 may be passively or actively opened and closed depending on the embodiment. Lower shield 202 is substantially flush with fuselage 208 in the closed position and has an aft side 214 that contours the circumference of landing wheel 216. Upper shield 204 is coupled to actuation strut assembly 218. Upper shield 204 may be fixedly or hingably coupled to actuation strut assembly 218 depending on the embodiment. In other embodiments, upper shield 204 may be coupled to wheel rotation strut assembly 212. In the stowed position, aft side 220 of upper shield 204 contours the circumference of landing wheel 216. Lower and upper shields 202, 204 may be shaped to minimize gaps 222 therebetween in the stowed position, as well as minimize any gaps between shields 202, 204 and landing wheel 216. In some embodiments, gaps 222 may be sealed with stripping or other types of sealant to prevent airflow therethrough.

Figure 4A:
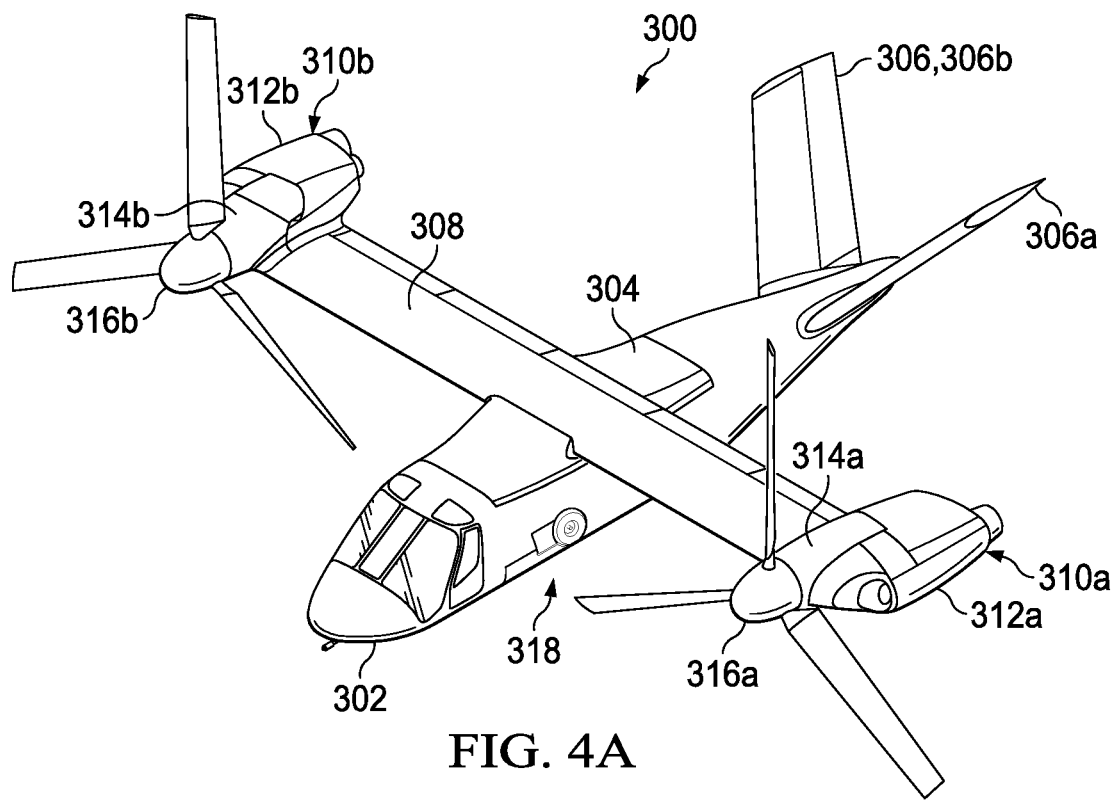
FIGS. 4A-4B are schematic illustrations of a tiltrotor aircraft having a retractable landing gear system in accordance with embodiments of the present disclosure.
Figure 4B:
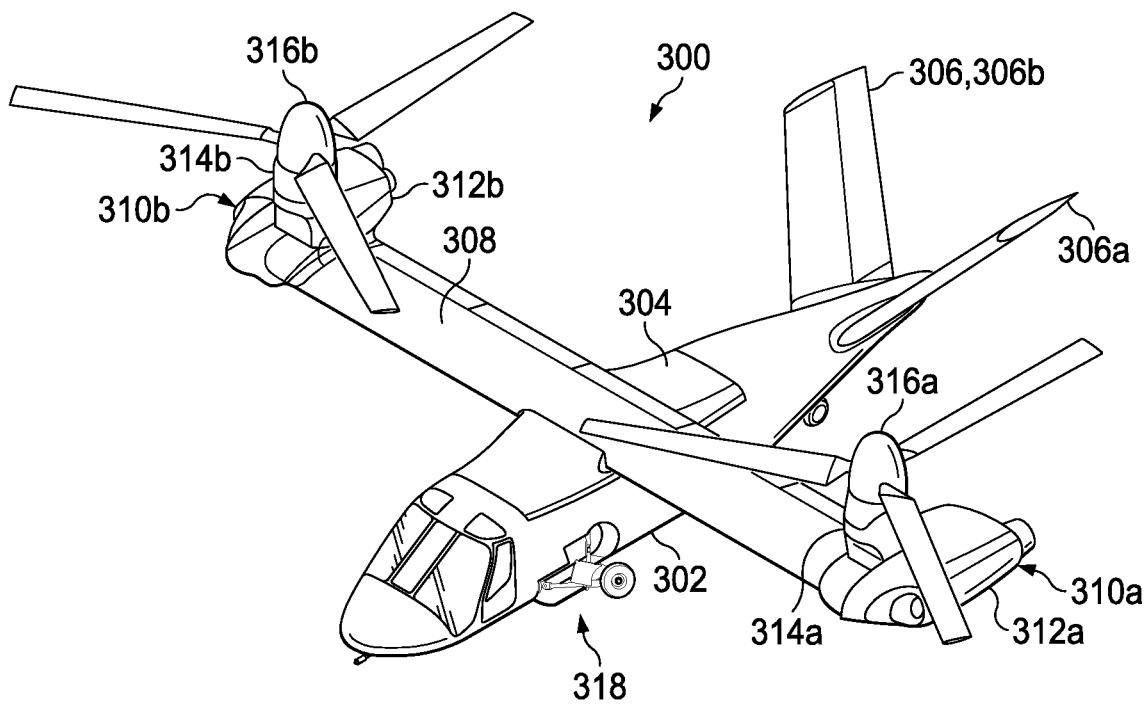

Referring to FIGS. 4A-4B in the drawings, a tiltrotor aircraft is schematically illustrated and generally designated 300. Tiltrotor aircraft 300 includes a fuselage 302, a wing mount assembly 304 and a tail assembly 306 including rotatably mounted tail members 306a, 306b having control surfaces operable for horizontal and/or vertical stabilization during forward flight. A wing member 308 is supported by wing mount assembly 304. Coupled to outboard ends of wing member 308 are propulsion assemblies 310a, 310b. Propulsion assembly 310a includes a nacelle depicted as fixed pylon 312a that houses an engine and a transmission. Thus, the nacelle is fixed relative to wing member 308. In addition, propulsion assembly 310a includes a mast assembly 314a having a mast that is rotatable relative to fixed pylon 312a, wing member 308 and fuselage 302 between a generally horizontal orientation, as best seen in FIG. 4A, and a generally vertical orientation, as best seen in FIG. 4B. Propulsion assembly 310a also includes a proprotor assembly 316a, including proprotor blade assemblies radiating therefrom, which is rotatable responsive to torque and rotational energy provided via a rotor hub assembly and drive system mechanically coupled to the engine and transmission housed by fixed pylon 312a. Similarly, propulsion assembly 310b includes a nacelle depicted as fixed pylon 312b that houses an engine and transmission and a mast assembly 314b that is rotatable relative to fixed pylon 312b, wing member 308 and fuselage 302. Propulsion assembly 310b also includes a proprotor assembly 316b, including proprotor blade assemblies radiating therefrom, which is rotatable responsive to torque and rotational energy provided via a rotor hub assembly and drive system mechanically coupled to the engine and transmission housed by fixed pylon 312b.

FIG. 4A illustrates tiltrotor aircraft 300 in airplane or forward flight mode, in which proprotor assemblies 316a, 316b are rotating in a substantially vertical plane to provide a forward thrust enabling wing member 308 to provide a lifting force responsive to forward airspeed, such that tiltrotor aircraft 300 flies much like a conventional propeller driven aircraft. FIG. 4B illustrates tiltrotor aircraft 300 in helicopter or vertical takeoff and landing (VTOL) flight mode, in which proprotor assemblies 316a, 316b are rotating in a substantially horizontal plane to provide a lifting thrust, such that tiltrotor aircraft 300 flies much like a conventional helicopter. It should be appreciated that tiltrotor aircraft 300 can be operated such that proprotor assemblies 316a, 316b are selectively positioned between forward flight mode and VTOL flight mode, which can be referred to as a conversion flight mode. Even though tiltrotor aircraft 300 has been described as having one engine in each fixed pylon 312a, 312b, it should be understood by those having ordinary skill in the art that other engine arrangements are possible and are considered to be within the scope of the present disclosure including, for example, having a single engine which may be housed within fuselage 302 that provides torque and rotational energy to both proprotor assemblies 316a, 316b. Tiltrotor aircraft 300 includes retractable landing gear system 318, which can be stowed as shown in FIG. 4A and deployed as shown in FIG. 4B. Retractable landing gear system 318 may be deployed while tiltrotor aircraft 300 is in forward flight mode for takeoffs and landings on a runway or VTOL flight mode for vertical takeoffs and landings. The implementation of retractable landing gear system 318 on tiltrotor aircraft 300 is illustrative of the wide range of aircraft on which retractable landing gear system 318 may be utilized.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A retractable landing gear system configured to contour an aircraft fuselage comprising:
    a landing wheel having an axle;
    a wheel rotation strut assembly coupling the landing wheel to the aircraft fuselage, the wheel rotation strut assembly including upper and lower rotator struts having a common axis of rotation, the axle of the landing wheel pivotably coupled to a distal end of the wheel rotation strut assembly; and
    an actuation strut assembly configured to move the wheel rotation strut assembly between a plurality of positions including a deployed position and a stowed position;
    wherein, the axle of the landing wheel is configured to pivot relative to the wheel rotation strut assembly as the actuation strut assembly moves the wheel rotation strut assembly between the deployed and stowed positions such that the landing wheel generally contours the aircraft fuselage when the wheel rotation strut assembly is in the stowed position;
    wherein, the lower rotator strut rotates relative to the upper rotator strut as the actuation strut assembly moves the wheel rotation strut assembly between the deployed and stowed positions to pivot the axle of the landing wheel relative to the lower rotator strut; and
    wherein, the upper rotator strut has a larger angle of rotation about the common axis than the lower rotator strut as the wheel rotation strut assembly moves between the deployed and stowed positions.

2. The retractable landing gear system as recited in claim 1 wherein the landing wheel is exposed when the wheel rotation strut assembly is in the stowed position.

3. The retractable landing gear system as recited in claim 1 wherein the landing wheel is generally flush with the aircraft fuselage when the wheel rotation strut assembly is in the stowed position.

4. The retractable landing gear system as recited in claim 1 wherein the axle of the landing wheel pivots about a landing wheel alignment axis, the landing wheel alignment axis perpendicular to the common axis of rotation of the upper and lower rotator struts.

5. The retractable landing gear system as recited in claim 1 wherein the actuation strut assembly is coupled to the lower rotator strut.

6. The retractable landing gear system as recited in claim 1 wherein the wheel rotation strut assembly further comprises a wheel axle pivot subassembly activated by the relative rotation between the upper and lower rotator struts to pivot the axle of the landing wheel relative to the lower rotator strut.

7. The retractable landing gear system as recited in claim 6 wherein the wheel axle pivot subassembly further comprises:
    a gear coupled to the upper rotator strut;
    a linear gearbox engaged with the gear and coupled to the lower rotator strut; and
    an axle positioning rod engaged with the linear gearbox and having an end coupled to the axle of the landing wheel.

8. The retractable landing gear system as recited in claim 7 wherein the relative rotation between the upper and lower rotator struts causes the gear to drive the linear gearbox to move the axle positioning rod, thereby pivoting the axle of the landing wheel relative to the lower rotator strut.

9. The retractable landing gear system as recited in claim 1 wherein the actuation strut assembly further comprises a shock absorber.

10. The retractable landing gear system as recited in claim 1 wherein the actuation strut assembly further comprises a gear retraction actuator configured to move the wheel rotation strut assembly between the deployed and stowed positions, the gear retraction actuator having an end coupled to the aircraft fuselage.

11. The retractable landing gear system as recited in claim 10 wherein the actuation strut assembly further comprises an upper swinging arm having an end hingably coupled to the aircraft fuselage.

12. The retractable landing gear system as recited in claim 11 wherein the gear retraction actuator has a second end coupled to the upper swinging arm.

13. The retractable landing gear system as recited in claim 1 further comprising a cardan pin having proximal and distal ends, the proximal end of the cardan pin hingably coupled to the aircraft fuselage, the distal end of the cardan pin hingably coupled to the wheel rotation strut assembly.

14. The retractable landing gear system as recited in claim 1 further comprising a pivoting axle mount having a distal end coupled to the axle of the landing wheel and a proximal end hingably coupled to the distal end of the wheel rotation strut assembly, the pivoting axle mount pivoting relative to the wheel rotation strut assembly as the actuation strut assembly moves the wheel rotation strut assembly between the deployed and stowed positions.

15. An aircraft comprising:
  a fuselage; and
  a retractable landing gear system configured to contour the fuselage, the retractable landing gear system comprising:
    a landing wheel having an axle;
    a wheel rotation strut assembly coupling the landing wheel to the fuselage, the wheel rotation strut assembly including upper and lower rotator struts having a common axis of rotation, the axle of the landing wheel pivotably coupled to a distal end of the wheel rotation strut assembly; and
    an actuation strut assembly configured to move the wheel rotation strut assembly between a plurality of positions including a deployed position and a stowed position;
    wherein, the axle of the landing wheel is configured to pivot relative to the wheel rotation strut assembly as the actuation strut assembly moves the wheel rotation strut assembly between the deployed and stowed positions such that the landing wheel generally contours the fuselage when the wheel rotation strut assembly is in the stowed position;
    wherein, the lower rotator strut rotates relative to the upper rotator strut as the actuation strut assembly moves the wheel rotation strut assembly between the deployed and stowed positions to pivot the axle of the landing wheel relative to the lower rotator strut; and
    wherein, the upper rotator strut has a larger angle of rotation about the common axis than the lower rotator strut as the wheel rotation strut assembly moves between the deployed and stowed positions.

16. The aircraft as recited in claim 15 wherein the fuselage forms a compartment to receive the wheel rotation strut assembly and the landing wheel in the stowed position; and
  wherein the actuation strut assembly further comprises a plurality of segments foldable into the fuselage compartment when the wheel rotation strut assembly is in the stowed position.

17. The aircraft as recited in claim 15 further comprising an upper shield coupled to the actuation strut assembly such that when the wheel rotation strut assembly is in the stowed position, the upper shield is substantially flush with the fuselage and at least one side of the upper shield contours a circumference of the landing wheel.

18. The aircraft as recited in claim 17 further comprising a lower shield hingably coupled to the fuselage and configured to open as the wheel rotation strut assembly moves into the deployed position and close as the wheel rotation strut assembly moves into the stowed position, the lower shield substantially flush with the fuselage in the closed position.

19. A retractable landing gear system configured to contour an aircraft fuselage comprising:
  a landing wheel having an axle;
  a wheel rotation strut assembly coupling the landing wheel to the aircraft fuselage, the wheel rotation strut assembly including upper and lower rotator struts having a common axis of rotation and a wheel axle pivot subassembly, the axle of the landing wheel pivotably coupled to a distal end of the wheel rotation strut assembly; and
  an actuation strut assembly configured to move the wheel rotation strut assembly between a plurality of positions including a deployed position and a stowed position;
  wherein, the axle of the landing wheel is configured to pivot relative to the wheel rotation strut assembly as the actuation strut assembly moves the wheel rotation strut assembly between the deployed and stowed positions such that the landing wheel generally contours the aircraft fuselage when the wheel rotation strut assembly is in the stowed position;
  wherein, the lower rotator strut rotates relative to the upper rotator strut as the actuation strut assembly moves the wheel rotation strut assembly between the deployed and stowed positions to pivot the axle of the landing wheel relative to the lower rotator strut; and
  wherein, the wheel axle pivot subassembly includes a gear coupled to the upper rotator strut, a linear gearbox engaged with the gear and coupled to the lower rotator strut and an axle positioning rod engaged with the linear gearbox and having an end coupled to the axle of the landing wheel such that the wheel axle pivot subassembly is activated by the relative rotation between the upper and lower rotator struts to pivot the axle of the landing wheel relative to the lower rotator strut.

20. The retractable landing gear system as recited in claim 19 wherein the landing wheel is generally flush with the aircraft fuselage when the wheel rotation strut assembly is in the stowed position.

* * * * *